United States Patent [19]

McIntyre et al.

[11] Patent Number: 4,511,441

[45] Date of Patent: * Apr. 16, 1985

[54] METHOD OF OPERATING A LIQUID-GAS ELECTROCHEMICAL CELL

[75] Inventors: James A. McIntyre; Robert F. Phillips, both of Midland, Mich.

[73] Assignee: The Dow Chemical Company, Midland, Mich.

[*] Notice: The portion of the term of this patent subsequent to Sep. 27, 2000 has been disclaimed.

[21] Appl. No.: 525,862

[22] Filed: Aug. 24, 1983

Related U.S. Application Data

[63] Continuation-in-part of Ser. No. 349,891, Feb. 18, 1982, Pat. No. 4,406,758.

[51] Int. Cl.³ .................... C25B 1/46; C25B 1/30
[52] U.S. Cl. .................... 204/98; 204/84; 204/128; 204/265; 429/14; 429/15; 429/44
[58] Field of Search ............ 204/98, 128, 101, 84, 204/265; 429/14, 15, 44

[56] References Cited

U.S. PATENT DOCUMENTS

| | | |
|---|---|---|
| 3,969,201 | 7/1976 | Oloman et al. ............ 204/1 R |
| 4,118,305 | 10/1978 | Oloman et al. ............ 204/95 |
| 4,260,469 | 4/1981 | McIntyre et al. ............ 204/265 |
| 4,406,758 | 9/1983 | McIntyre et al. ............ 204/98 |

Primary Examiner—Howard S. Williams
Assistant Examiner—Terryence Chapman
Attorney, Agent, or Firm—J. H. Dickerson

[57] ABSTRACT

The invention includes in its scope a method for electrochemically reacting a liquid with a gas in an electrochemical cell of the type having at least two electrodes separated by a liquid permeable separator. At least one of said electrodes is in physical contact with the separator and is porous and self-draining. A gas is flowed into at least a portion of the pores of the self-draining electrode and a liquid is controllably flowed through the separator and into the self-draining electrode at a rate about equal to the drainage rate of the electrode and in a quantity sufficient to fill only a portion of the electrode pores. The liquid and the gas are electrochemically reacted to form at least one nonvolatile product. Thereafter, the products of the electrochemical reaction are removed from said self-draining electrode.

13 Claims, 2 Drawing Figures

METHOD OF OPERATING A LIQUID-GAS ELECTROCHEMICAL CELL

This application is a continuation-in-part of the copending application Ser. No. 349,891, filed Feb. 18, 1982, now U.S. Pat. No. 4,406,758.

This invention is an improved method of operating an electrochemical cell.

BACKGROUND OF THE INVENTION

Gas electrodes, for example oxygen electrodes, are well known in the art and are useful in many processes including chlor-alkali processes and processes for the production of hydrogen peroxide. Oxygen electrodes are generally porous. In such electrodes, reactions occur at the point(s) where there is a three-phase contact between a gas, an electrolyte solution and a solid electrical conductor. To maximize the efficiency of the electrode, the amount of the three-phase contact area should be maximized. If the electrode is filled with the electrolyte, the rate of mass transfer of gas to the electrical conductor is too slow to be significant and is therefore not useful. Conversely, if the electrode is filled with gas, the absence of the electrolyte solution allows only insignificant amounts of reactions to occur.

Packed bed electrolytic cells of the type described in U.S. Pat. Nos. 3,969,201 and 4,118,305 are commonly used. A porous separator separates the packed bed electrode from the adjoining electrode and is supported by the packed bed electrode. The pores of the separator are sufficiently large to allow free flow of electrolyte into the openings of the packed bed electrode. Electrochemical reactions occur within the electrode at a gas-electrolyte-electrode interface. The liquid products and unreacted electrolyte flow by gravity to the bottom of the packed bed electrode. Mass transfer is a problem in such cells because the electrode is almost flooded with electrolyte. Reactions are slow and recycle of the product is necessary.

SUMMARY OF THE INVENTION

The invention includes in its scope a method for electrochemically reacting a liquid with a gas in an electrochemical cell of the type having at least two electrodes separated by a liquid permeable separator. At least one of said electrodes physically contacts the separator and is porous and self-draining. A gas is flowed into at least a portion of the pores of the self-draining electrode and a liquid is controllably flowed through the separator and into the self-draining electrode at a rate about equal to the drainage rate of the electrode and in a quantity sufficient to fill only a portion of the electrode pores. The liquid and the gas are electrochemically reacted to form at least one nonvolatile product. Thereafter, the products of the electrochemical reaction are removed from said self-draining electrode.

DETAILED DESCRIPTION OF THE DRAWINGS

Figure 1:
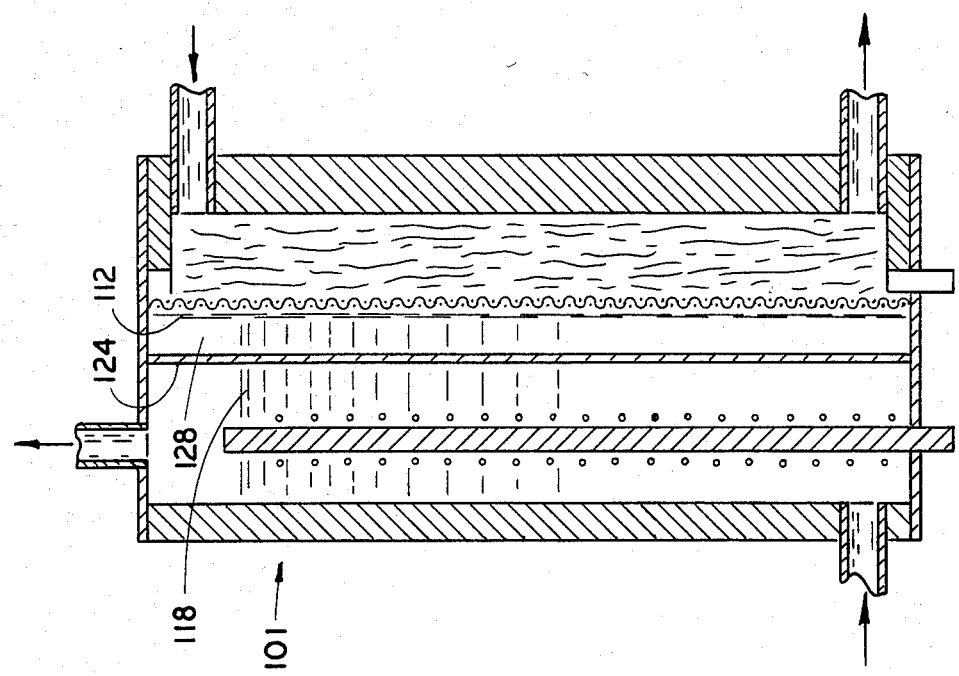
FIG. 1 illustrates one embodiment of the invention in an electrolytic cell which has a diaphragm-type separator.

In the illustrated embodiment of the invention, FIG. 1 shows an electrolytic cell 100. The cell has an anode 120 which is located in an anolyte chamber. An electrolyte inlet port 116 opens into the anolyte chamber. A gaseous product outlet port 122 is located in the anolyte chamber.

The cathode 106 is an electrically conductive porous mass having a plurality of pores passing therethrough. It may be a bed of electroconductive sintered particles or an agglomeration of loose particles. It must have pores of sufficient size and number to allow both gas and liquid to flow therethrough. The pores must also be of a sufficient size such that nonvolatile products will flow by gravity to the lower portion of the cathode 106, i.e., the cathode should be "self-draining". Another way of expressing this is to describe the pores as being large enough so that gravity has a greater effect on the liquid in the electrode than does capillary pressure.

Optionally, the cathode may be supported in some manner. For example, FIG. 1 shows a porous screen support 102 for the cathode.

A diaphragm-type separator 112 is positioned against the cathode 106 or the cathode support 102. It may be a mass of tightly packed fibers such as asbestos or fluorocarbon fibers which may be woven or merely agglomerated in a random fashion. The separator 112 may be a plurality of layers or a single layer. However, the separator material should be subtantially chemically inert to the chemicals that it will contact under ordinary operating conditions. The separator is constructed so that it has a somewhat limited ability to allow a liquid to flow therethrough. Uncontrolled flow of liquid through the separator is intolerable in the present invention. The separator and electrode are positioned to be in physical contact with each other, so that liquids flowing through the separator flow immediately into the electrode. The space therebetween should be minimized to provide the most efficient control of the amount of liquid flowing through the separator into the electrode. The separator may be supported by the electrode, or it may be supported by a separate support element. Optionally, the separator may be self-supporting.

Figure 2:
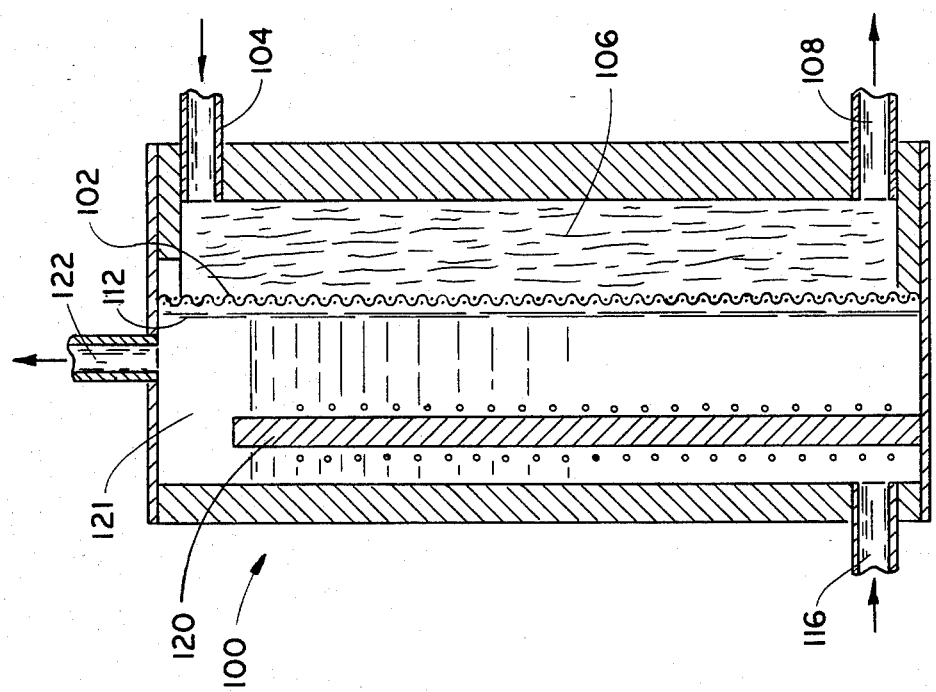
FIG. 2 shows another embodiment of the invention. Illustrated is an electrolytic cell which has an ion exchange membrane in addition to a diaphragm-type separator.

FIG. 2 illustrates another embodiment of the invention. It shows an electrolytic cell 101 having an ion exchange membrane 124. This embodiment operates in a manner quite similar to the cell illustrate in FIG. 1. Here, the ion exchange membrane acts as a barrier to control the migration of ions into and out of the cathode chamber 128.

In the embodiment of FIG. 2, the hydraulic pressure on the separator 112 is controlled in the same manner as was discussed in relation to the cell in FIG. 1.

As with the embodiment in FIG. 1, the electrolyte which is in contact with the separator must exert a hydraulic pressure on the separator. In FIG. 2, however, it is the electrolyte in the cathode chamber 128 which exerts the critical hydraulic pressure. Thus, the method of controlling the hydraulic pressure of the electrolyte on the separator refers to the electrolyte in the cathode chamber 128, rather than to the electrolyte in the anode chamber 118 of FIG. 1.

In the invention, liquid flow through the separator 112 should be controlled at a level sufficient to fill only a portion of the pores in the cathode 106. If too much liquid passes through the separator and substantially all of the pores of the cathode 106 are filled, the presence of oxygen gas is minimized. This results in a very slow reaction to form the products of electrolysis. Conversely, if too little electrolyte passes through the separator 112 and into the pores of the cathode 106, the electrochemical reactions will be minimized. A critical aspect of the present invention is to prevent the almost total filling of the cathode pores while at the same time preventing the almost total absence of electrolyte from the cathode pores.

The volume of liquid flowing through a porous separator is thought to be defined by the following equation:

$$V = \frac{KA\Delta P}{\mu d}$$

where
V = volume flow rate, cm$^3$/sec.
K = permeability, cm$^2$
A = geometric area of the surface of of the separator contacted by the liquid, cm$^2$
$\Delta P$ = pressure drop across the separator, g/cm sec$^2$
$\mu$ = liquid viscosity, g/cm sec.
d = separator thickness, cm.

Generally, the viscosity ($\mu$) of the liquid is constant and depends upon the process in which the invention is used. The construction of the separator determines its thickness (d) and its permeability (K).

Generally, diaphragms used in chlor-alkali electrolyte cells have permeabilities (K) from about $1 \times 10^{-8}$ to about $1 \times 10^{-10}$ cm$^2$. Naturally this varies with the variables in the equation shown above.

Thus, there are two convenient means for controlling the flow through the separator into the electrode. One way is by varying the area (A) of the separator contacted by the liquid and a second way is by adjusting $\Delta P$, the pressure drop across the separator.

A convenient way of controlling the area of the separator exposed to the liquid is by increasing or decreasing the height of the liquid reservoir adjoining the separator. As the height is increased, the flow through the separator increases. Conversely, as the height is decreased, the flow decreases.

The other method of controlling the flow through the separator is by controlling the pressure drop across the separator. This pressure drop may be controlled in several ways.

One method of controlling the pressure drop across the separator is by operating the chamber opposite the self-draining electrode under gas or liquid pressure. In this method, the opposing chamber is sealed from the atmosphere and gas pressure or liquid pressure is exerted on the electrolyte. High pressure pumps may be used to force a pressurized liquid into the opposing chamber or pressurized gas may be fed to the chamber.

Another method of controlling the pressure drop across the separator is by pulling a vacuum on the self-draining electrode side of the separator. This will pull the electrolyte toward and through the separator and finally into the self-draining electrode.

The herein described method may be used in any process in which a liquid is reacted with a gas. It is particularly useful in electrochemical cells. It is particularly useful in cells used for the production of hydrogen peroxide, for the production of chlorine and caustic and for the production of energy (fuel cells).

Although the herein described method may be used in a variety of electrolytic processes, its use will be described for the production of chlorine and caustic. In operation of the electrolytic cell 100, a NaCl brine solution is fed into the anode compartment through inlet port 116. The electrolyte contacts the anode 120 and the diaphragm-type separator 112. Hydraulic pressure is exerted by the electrolyte upon the separator 112.

An oxygen containing gas enters the porous, self-draining cathode 106 through a gas inlet 104. The gas flows through the pores of the cathode 106 where electrochemical reactions occur with the electrolyte. At least a portion of the gas is consumed in such reactions to produce sodium hydroxide. The liquid sodium hydroxide flows by gravity to the lower portion of the cathode 106 and is removed through outlet port 108.

The hydraulic pressure of the electrolyte against the separator 112 is controlled at a level which will force the electrolyte to flow through the separator 112 and into the porous, self-draining cathode 106.

EXAMPLE

An aqueous slurry containing asbestos fibers was prepared. The slurry was vacuum drawn through a porous plate and a substantial portion of the asbestos was thereby deposited on the porous plate. Asbestos was so deposited until the asbestos layer of the separator had a thickness of $\frac{1}{8}$ to $\frac{1}{4}$ inch.

The so-formed separator was subjected to a series of measurements to determine the flow rate of a fluid through the separator at various fluid head pressures. The results were as follows:

| Head Pressure (psi) | Flow (ml/sec-cm$^2$) |
| --- | --- |
| 0.5 | $8.2 \times 10^{-4}$ |
| 1.0 | $1.4 \times 10^{-3}$ |
| 1.5 | $2.0 \times 10^{-3}$ |
| 2.0 | $2.6 \times 10^{-3}$ |
| 2.5 | $3.1 \times 10^{-3}$ |
| 3.0 | $3.6 \times 10^{-3}$ |
| 3.5 | $4.0 \times 10^{-3}$ |

What is claimed is:

1. A method for electrochemically reacting a liquid with a gas in an electrochemical cell of the type having at least two electrodes separated by a liquid permeable separator; at least one of said electrodes being in physical contact with said separator and being porous and self-draining, said method comprising:
   (a) flowing a gas into at least a portion of the pores of the self-draining electrode;
   (b) controllably flowing the liquid through said separator and into the self-draining electrode at a rate about equal to the drainage rate of the electrode and in a quantity sufficient to fill only a portion of the electrode pores;
   (c) electrochemically reacting the liquid with the gas to form at least one nonvolatile product; and
   (d) removing the electrochemical products from said self-draining electrode.

2. The method of claim 1 including controlling the amount and rate of liquid flowing through the separator by adjusting the area of the separator contacted by the liquid.

3. The method of claim 1 wherein the amount and rate of liquid flowing through the separator is controlled by adjusting the atmospheric pressure exerted on the liquid.

4. The method of claim 1 wherein the nonvolatile product is sodium hydroxide.

5. The method of claim 4 where the self-draining electrode is a cathode.

6. The method of claim 1 wherein the gas is an oxygen containing gas.

7. The method of claim 6 wherein the oxygen containing gas is air.

8. The method of claim 6 wherein the oxygen containing gas is substantially pure oxygen.

9. The method of claim 6 where the self-draining electrode is a cathode.

10. The method of claim 1 where the self-draining electrode is a cathode.

11. The method of claim 10 wherein the cell includes an ion exchange membrane located between the separator and an anode.

12. The method of claim 1 wherein the separator is self-supporting.

13. The method of claim 1 wherein the separator is supported by a support element.

* * * * *